April 7, 1970  E. C. RICKS ET AL  3,504,593
AIRBORNE ROCKET LAUNCHER
Filed Oct. 25, 1968  3 Sheets-Sheet 3
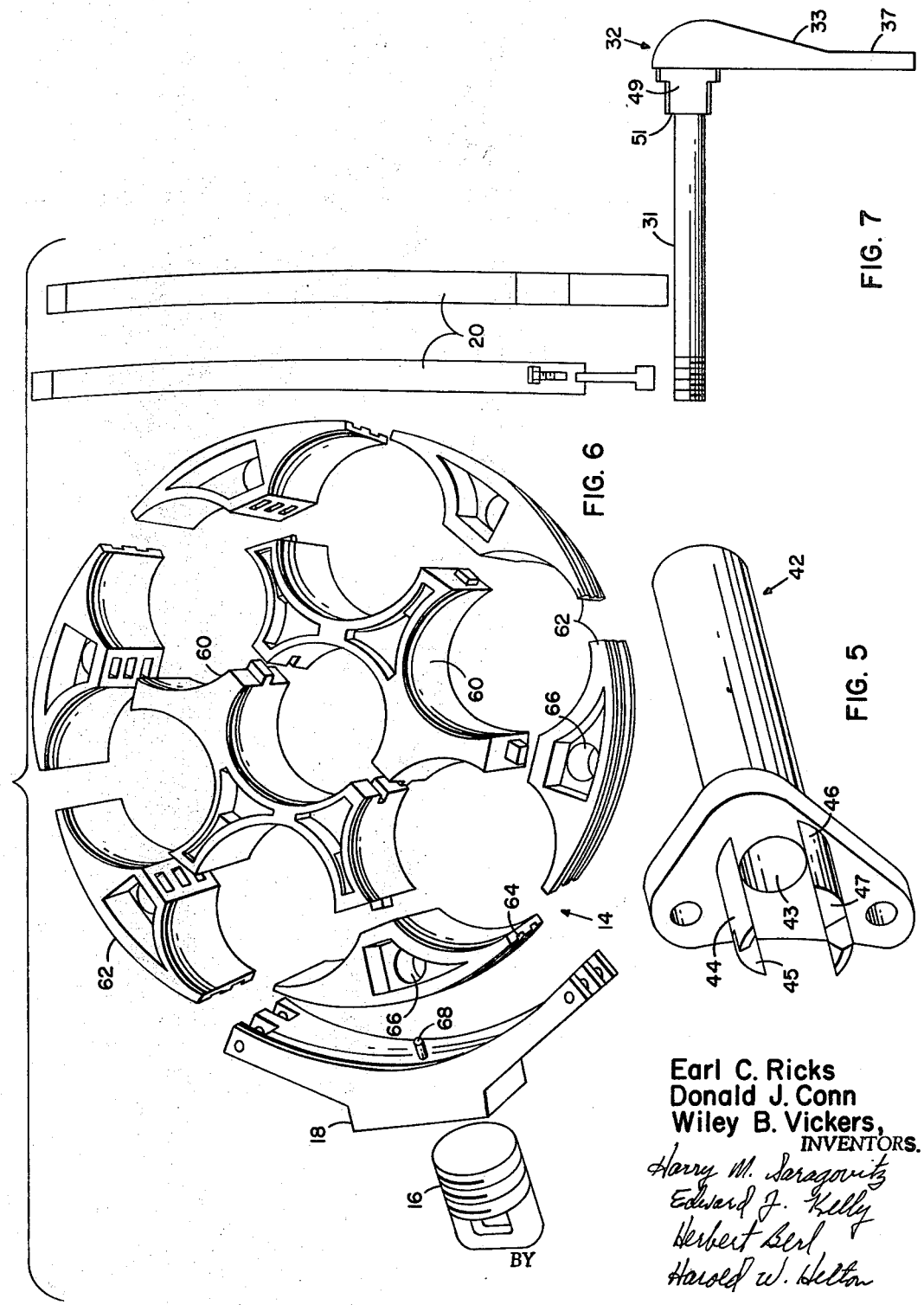
Earl C. Ricks
Donald J. Conn
Wiley B. Vickers,
INVENTORS.
Harry M. Saragovitz
Edward J. Kelly
Herbert Berl
Harold W. Hilton
BY 
United States Patent Office 3,504,593
Patented Apr. 7, 1970

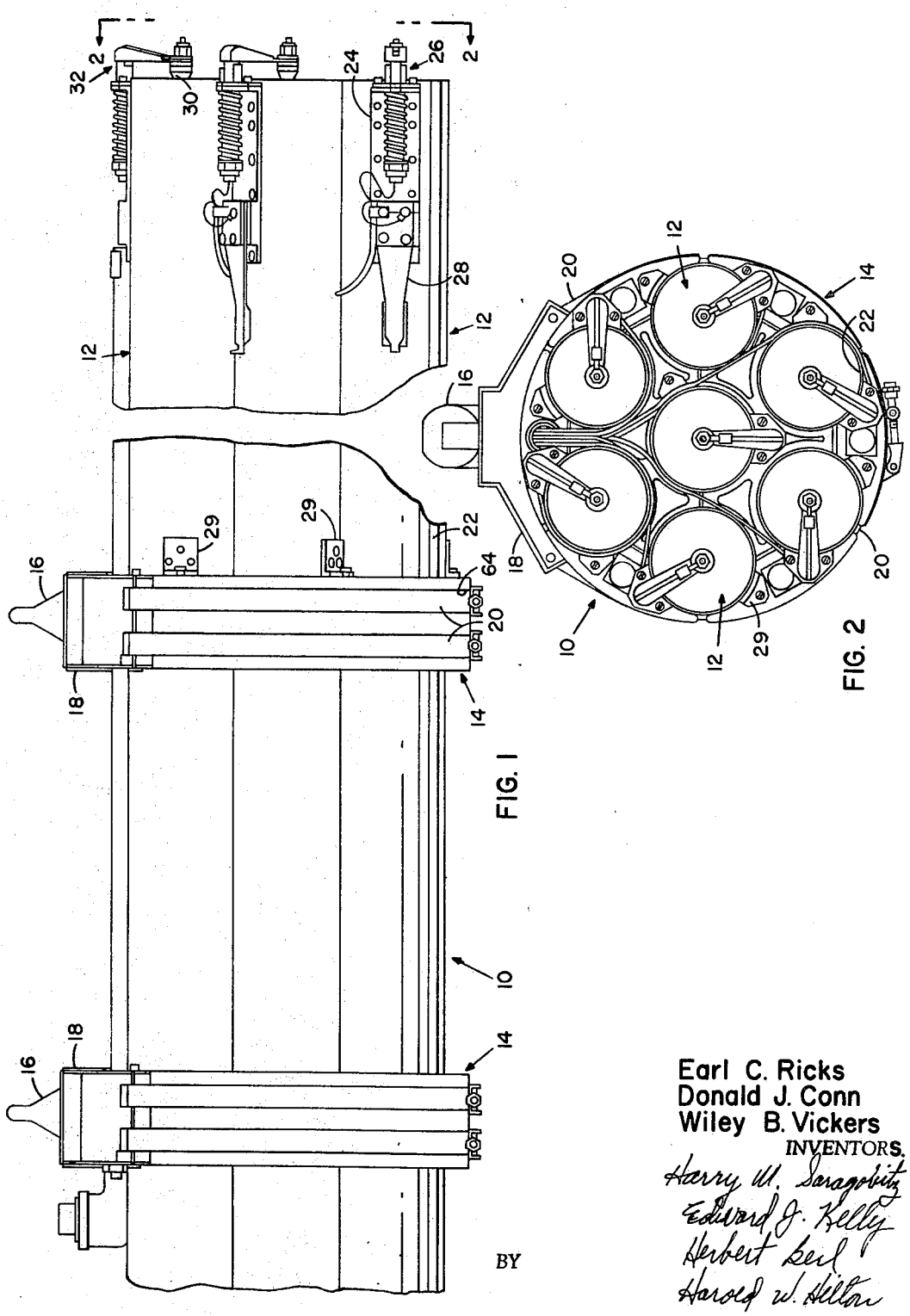

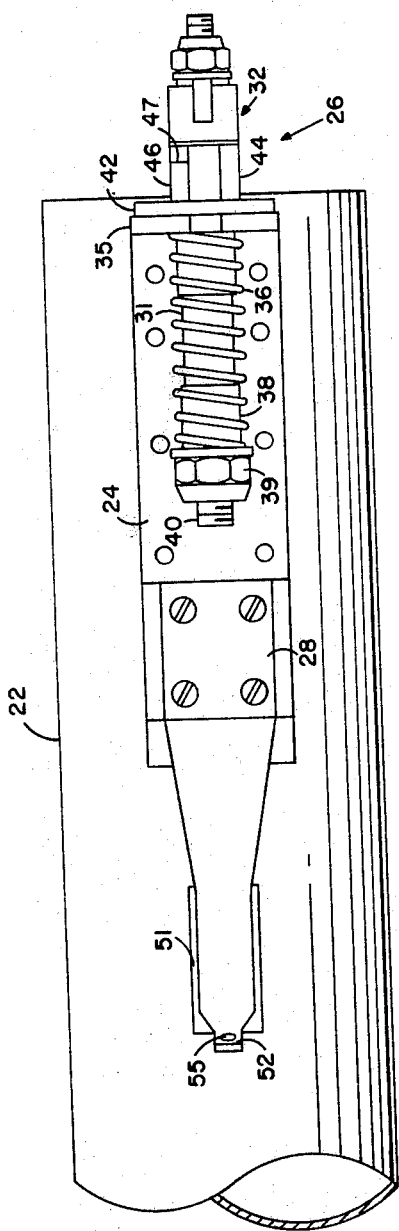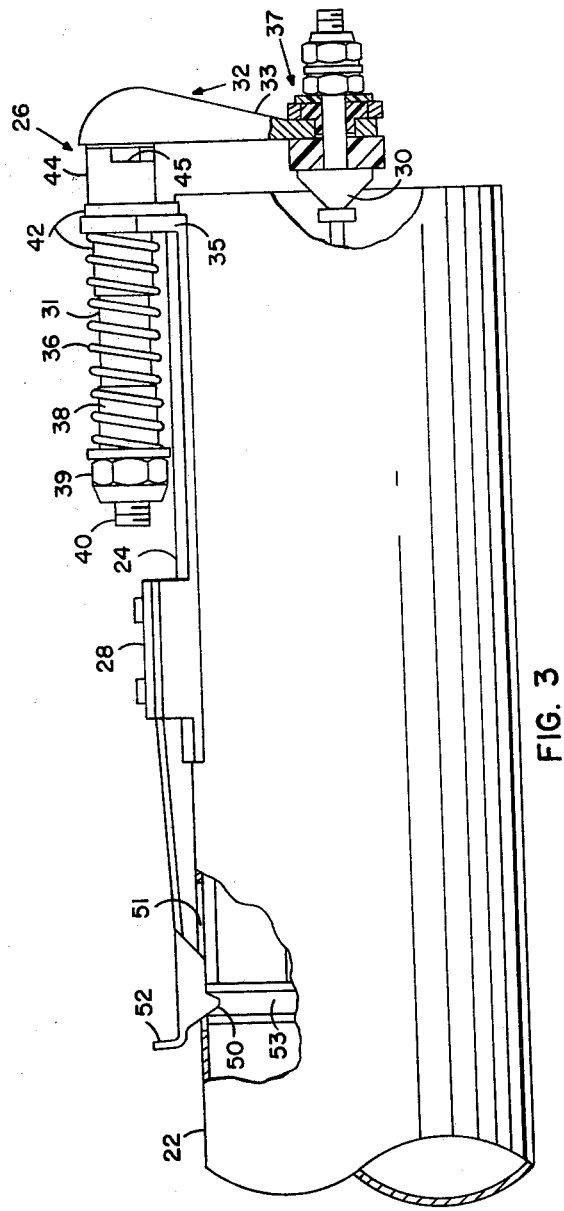
Earl C. Ricks
Donald J. Conn
Wiley B. Vickers,
INVENTORS.

3,504,593
AIRBORNE ROCKET LAUNCHER
Earl C. Ricks, Donald J. Conn, and Wiley B. Vickers, Huntsville, Ala., assignors to the United States of America as represented by the Secretary of the Army
Filed Oct. 25, 1968, Ser. No. 770,492
Int. Cl. F41f 3/04
U.S. Cl. 89—1.807                                    7 Claims

ABSTRACT OF THE DISCLOSURE

A light-weight, reusable, and field repairable rocket launcher. The launcher includes a cluster of interchangeable launch tube assemblies held and supported by two bulkheads. The bulkheads comprise interchangeable and interlocking castings that are clamped together with clamping bands. The launch tube assemblies each comprise a rocket launch tube with an easily releasable detent and an igniter assembly. The detent includes a member extending into the tube for engagement with the rocket and retention thereof in the tube during transportation of the launcher and for release of the rocket responsive to ignition thereof. The igniter assembly includes a rocket tail engaging member which is secured between the tube and the rocket in spring biased relation. An igniter head is carried by the tail engaging member, substantially along the longitudinal axis of the tube and is held in engagement with the rocket by the spring assembly. The tail engaging member is disposed for rotational movement for displacement of the igniter head from a first position of engagement with the rocket to a second position which clears the launch tube to permit rearward unloading or loading.

BACKGROUND OF THE INVENTION

Various types of military aircraft are equipped with rocket launchers that are normally mounted adjacent to the fuselage or wing. In rocket launchers of this type that are designed for repeated use, the launch tubes are often encased in a bulkhead support structure which carries the tubes. Excessive wear or damage to the tubes or any portion of the rocket launcher, often results in the launcher being discarded or removed to an area for repairs. This can involve loss of useful components in discarded launchers and loss of time in packaging and shipping launchers to be repaired. An additional problem encountered in conventional launchers includes the inability to load tubes from the rear when fixed igniters or firing pins are utilized. Also, vibration when the launchers are airborne produces problems in firing arms that swivel readily, such as inadvertently firing of adjacent rounds and wire breakage. These and other similar and related problems are overcome by applicants' invention.

SUMMARY OF THE INVENTION

The apparatus of the present invention is a rocket launcher for launching rockets from aircraft and that may be readily repaired in the field without requiring the use of special tools. A plurality of launch tube assemblies are maintained in a circular cluster by two simple support structures referred to as bulkheads. The bulkheads include several interchangeable parts that are banded together. The launch tubes are designed to be used as a structural member, thus eliminating the bulk of support structure to enclose the tubes, such as a shroud, etc. Launch tube assemblies include an igniter assembly and a detent device. The igniter assembly includes a rocket tail engaging member attached at the rear end of the launch tube and spring biased between the tube and rocket mounted therein. The tail engaging member includes an igniter carried substantially along the longitudinal axis of the tube and is held in contact with the rocket by the spring assembly. The igniter may be rotated from a first position of engagement with the rocket to a second position which clears the launch tube, thereby allowing loading and unloading from the rear. The igniter assembly also serves as a stop to prevent excessive rearward movement of the rocket. The detent device includes a member that extends through an opening in the side of the launch tube and engages the rocket, retaining the rocket within the tube during transportation of the launcher and releasing the rocket in response to ignition thereof.

It is an object of the present invention, therefore, to provide a reusable, field repairable rocket launcher.

It is another object of the present invention to provide such a launcher with a plurality of launch tubes arranged in a cluster and disposed for assembly and disassembly in a rapid and facile manner.

It is a further object of the present invention to provide such a launcher wherein each launch tube is provided with means for igniting the rocket carried therein while preventing accidental firing of the rockets carried in the adjacent tubes in the cluster.

It is still another object of the present invention to provide such a launcher wherein each tube is provided with a rocket tail engaging, igniting mechanism which is displaceable from a tail engaging position to provide for rear loading and unloading of the rockets in each tube.

Another object of the present invention is to provide an igniter mechanism which serves as a stop for a rocket and is also resiliently mounted to ensure continuous engagement of the igniter with the rocket even during extreme vibrations.

BRIEF DESCRIPTION OF THE DRAWINGS

FIGURE 1 is a side view of a rocket launcher in accordance with the instant invention.

FIGURE 2 is an end view of FIGURE 1 taken along line 2—2.

FIGURE 3 is a side view of a launch tube showing the igniter assembly and detent mechanism in engagement with a rocket prior to launching thereof.

FIGURE 4 is a plan view of the launch tube of FIGURE 3.

FIGURE 5 is a perspective view of the support for the igniter arm of the igniter assembly.

FIGURE 6 is a pictorial view of a disassembled bulkhead including the assembly bands therefor.

FIGURE 7 is a side view of the igniter arm.

DESCRIPTION OF THE PREFERRED EMBODIMENT

Referring now to the drawings wherein like numerals represent like parts in all figures, and wherein there is disclosed a preferred embodiment of the present invention. As shown in FIGURES 1 and 2, a rocket launcher 10 includes a plurality of launch tube assemblies 12 held in a circular cluster by support structures commonly referred to as bulkheads or bulkhead assemblies 14. Rocket launcher 10 is light weight, reusable, economical, and field repairable and requires no special tools for repair. It is primarily for use on rotary wing aircraft where its non-aerodynamic design would impose only insignificant drag penalties on the aircraft. However, it can be used on fixed wing aircraft where the additional drag is of little concern, or if desired, the launcher may be provided with fairings to reduce the drag when used on high speed aircraft.

Each launch tube assembly 12 consists of a launch tube 22, a support structure referred to as a strongback 24, an igniter assembly 26, a detent 28, and a tube clip 29.

Strongback 24 is mounted near the aft end of launch tube 22 and serves as a support for igniter assembly 26 and detent 28. Strongback 24 may be attached to tube 22 by any convenient means, such as riveting. Igniter assembly 26 and detent 28 may be attached to strongback 24 with a readily removable means, such as screws. Detent 28 is a leaf spring latch that extends into tube 22 to hold the round in the launch tube until it is fired. The detent also serves as a ground contact in the firing circuit. The igniter assembly includes a movable arm 32 attached to tube 22 and having an igniter head 30 thereon in contact with the rocket to ignite the propellant therein. Tube clip 29 serves to attach tube 22 to bulkhead assembly 14 and prevent fore and aft motion of launch tubes 22 within bulkhead assembly 14.

As shown in FIGURES 3, 4, and 7, igniter assembly 26 includes an igniter arm 32 having a first longitudinally extending portion 31 which is rotatably mounted in a support member 35 extending upwardly from strongback 24, and a second portion 33 extending radially inwardly toward the longitudinal axis of tube 22. An igniter head 30 is secured to the distal end 37 of arm portion 33 substantially coincident with the longitudinal axis of the tube. A pair of flat seating surfaces 49, as seen in FIGURE 7, is common to both arm portions 31 and 33 and assist in positioning igniter assembly 26 in either one of two positions to be discussed later.

A spring 36 is circumferentially mounted about arm portion 31 and seated between a spring retainer 38 and support member 35. Retainer 38 is held about arm portion 31 by a retainer nut 39 disposed at end 40 of arm portion 31 and in threaded relation therewith.

An igniter support member 42 is secured in support member 35 and is disposed for retention of the igniter head in a first position of engagement with the rocket or in a second position of rocket disengagement. In the second position the igniter arm is rotated to a position which clears the tube opening to permit rearward loading or unloading of the rockets. To accomplish this, member 42 (FIG. 5) includes a pair of upstanding members 44 and 46 having a space 43 therebetween. Upstanding member 44 and 46 are provided with stepped portions 45 and 47, respectively. For retention of the arm in engaged position with the rocket, a pair of flat seating surfaces 49 (FIG. 7) is provided on both sides of the arm for positioning in space 43 against the inner surface of portions 44 and 46. A surface 51 is provided at the base of surfaces 49. To position the arm for rearward loading or unloading, the arm is pulled against spring 36 until surface 51 clears stepped portions 45 and 47; arm 32 is rotated clockwise until surface 51 is seated on stepped portions 45 and 47 against the pull of spring 36. The loading position of firing arm 32 clears the aft end of tube 22 so that a rocket may be loaded or unloaded and holds igniter head 30 out of contact with adjacent components without blocking or preventing loading of adjacent launch tubes 22.

The detent 28, as seen in FIGURES 3 and 4, is a simple leaf type spring with a pair of rounded teeth 50 on it for holding the round in the launch tube 22 before firing. The teeth 50 extend into the tube 22 through an opening 51 in the side of the tube and engage a groove 53 on the rocket periphery. The detent 28 releases in response to ignition of and forward motion of the rocket. Detent 28 also serves to provide an electrical ground to the rocket through teeth 50. A turned up tab 52 with a hole 55 in it is on the latch end of detent 28 to facilitate unloading the rounds if necessary. Lifting the tab 52 released the teeth 50 from the round for ready removal.

Bulkhead assembly 14, the structure for retention of the tubes in the cluster for arrangement is shown disassembled in FIGURE 6. Two interchangeable and interlocking inner segments 60 form a cylindrical sleeve which holds a launch tube assembly 12 (not shown). A series of outer segments 62 combine with inner segments 60 to form additional sleeves surrounding the central sleeve formed by the inner segments. A pair of clamping bands (FIGURES 1 and 6) 20 fits into each of two grooves 64 on the outer segments 62 and are tightened to hold the assembly together. These clamping bands are anchored to a support structure referred to as a hardpoint 18. The launcher hardpoint 18 fits adjacent to the outer surface of any outer segment 62 and is held in place by the tightened clamping bands 20. Hardpoint 18 is also used to anchor the launched 10 to an aircraft by attaching an anchor lug 16 thereto. A guide pin 68 protruding from hardpoint 18 is disposed for insertion in a slot of member 62 for aligning the bulk head assembly with the hardpoint. Anchor pins (not shown) hold clamping bands 20 to launcher hardpoint 18.

A replaceable wiring harness and conduit serve to electrically connect the rocket launcher to the aircraft. The wiring conduit is not shown but would normally pass through an opening 66 in the outer segment 62 that is adjacent to the launcher hardpoint 18. Opening 66 may be readily provided in all outer segments 62 and designed such that the conduit may be readily routed therethrough. The launcher 10 may be designed to be jettisoned by the aircraft, if desired, by any convenient means such as by using explosive bolts for lug 16.

The particular firing circuit is not shown but it is to be understood that the circuit may be so designed that the operation may fire either single rockets or ripple fire as desired. A similar type firing circuit is disclosed in the patent application entitled "Intervalometer," filed Mar. 28, 1968, Ser. No. 716,793, by James B. Wright et al.

A similar device is disclosed in a copending application entitled Rocket Launcher by Kenneth K. Magnant, filed simultaneously with applicants' disclosure on Oct. 25, 1968, Ser. No. 770,684, and assigned to the U.S. Government as represented by the Department of Army.

In operation, the rocket launcher 10 is attached to a helicopter, for example, and loaded with rockets. The igniter arm 33 of each launch tube assembly is pulled against spring 36, unseating surfaces 49 from space 43. Arm 33 is rotated to rest surfaces 51 on stepped portions 45 and 47 of igniter support member 42. Rockets are loaded into tubes 22 from the rear and are pushed into the tubes until the teeth 50 of detent 28 engage the rockets. At this time arm 33 of each assembly is rotated back into position with surface 49 relocated in space 43 and firing head 30 contacting the rocket igniter. When all launch tube assemblies are thus loaded, the launcher is ready for firing, which may be accomplished from the helicopter by firing single rockets or by firing ripples, as desired. If for any reasons some of the rockets are not fired, they may be removed from launch tubes 22 by again rotating the igniter arms and lifting the tab 52 of detent 28. With tab 52 lifted, teeth 50 are disengaged from the rocket allowing the rocket to be pushed or pulled out of either end of the launch tube.

From the foregoing description it is obvious that field repairs of damaged components may be readily effected and only a small variety of parts need be available. It is also obvious that although a cluster of only 7 launcher assemblies is considered here, the cluster may well be of a greater quantity simply by adding additional bulkhead segments between the inner and outer segments for carrying additional launch tubes.

Although a particular embodiment and form of this invention has been illustrated, it is obvious to those skilled in the art that modifications may be made without departing from the scope and spirit of the foregoing disclosure. Therefore, it is understood that the invention is limited only by the claims appended hereto.

What is claimed is:
1. A rocket launcher comprising:
  (a) a plurality of launch tube assemblies each assembly including a launch tube;
  (b) means for releasably securing said tube assemblies in a cluster, comprising a pair of bulkheads disposed about said cluster in spaced relation which include first and second inner segments that are interchangeable and positioned to form a central support for said launch tubes, a plurality of interchangeable outer segments forming the outer support around said tubes, and clamping means for releasably securing said segments and tubes in assembled relationship;

(c) igniter means secured to each of said tube assemblies, said igniter means including an arm extending partially across the rear opening of each of said tubes, said arm disposed for displacement from a first position of engagement with the rocket, wherein said rocket is armed for ignition, to a second position of disengagement from said rocket for rear loading and unloading of said rocket; and (d) detent means carried by each of said tubes for releasably securing said rocket in said tube.

2. A rocket launcher as set forth in claim 1 wherein said igniter means includes:

(a) said igniter arm being rotatably secured to said tube and having a first portion extending radially inwardly, and a second portion extending longitudinally adjacent each of said tubes;

(b) an igniter head secured to the distal end of said arm and substantially coincident with the longitudinal axis of said rocket launcher tube.

3. A rocket launcher as set forth in claim 2 including igniter arm support means disposed for retention of said igniter arm in said first or second position responsive to positioning of said arm in the respective positions.

4. A rocket launcher as set forth in claim 3 including:

(a) a strongback carried by said tube for support of said igniter arm thereon:

(b) biasing means carried by said arm and in engagement with said strongback for biasing said igniter arm in desired position;

5. A rocket launcher as set forth in claim 4 wherein said igniter arm support member is carried about said second portion of said igniter arm and includes:

(a) a pair of upstanding members forming a first seat therebetween to receive said inwardly extending portion of said arm when said arm is in said first position; and, (b) a pair of stepped surfaces disposed to form a second seat therebetween to receive said radially inwardly extending portion of said arm when said arm is in said second position.

6. A rocket launcher as set forth in claim 5 wherein said detent means includes a leaf spring member protruding into said tube in engaged relation with said rocket and disposed for release of said rocket responsive to ignition thereof.

7. A rocket launcher as set forth in claim 6 wherein said detent means includes a tab extending therefrom exteriorly of said tube so that said detent may be grasped by said tab to manually release said detent from said rocket for unloading thereof.

References Cited

UNITED STATES PATENTS

| | | | |
|---|---|---|---|
| 2,712,270 | 7/1955 | Green | 89—1.807 |
| 3,315,565 | 4/1967 | Nash | 89—1.807 |
| 3,357,305 | 12/1967 | Clutz et al. | 89—1.816 X |

SAMUEL W. ENGLE, Primary Examiner

U.S. Cl. X.R.

89—1.814, 1.816